United States Patent [19]

Kamiya et al.

[11] Patent Number: 5,052,244
[45] Date of Patent: Oct. 1, 1991

[54] TORQUE VARIATION ABSORBING DEVICE

[75] Inventors: Masakazu Kamiya, Toyoaki; Kiyonori Kobayashi, Chiryu, both of Japan

[73] Assignee: Aisin Seiki Kabushiki Kaisha, Kariya, Japan

[21] Appl. No.: 522,834

[22] Filed: May 14, 1990

[30] Foreign Application Priority Data

May 12, 1989 [JP] Japan ................................ 1-119281

[51] Int. Cl.⁵ .......................... F16F 15/12; F16F 15/30
[52] U.S. Cl. ........................................ 74/574; 74/572; 192/106.2; 192/106.1; 464/66
[58] Field of Search .................... 74/572, 573, 574; 192/106.1, 106.2; 464/68, 66

[56] References Cited

U.S. PATENT DOCUMENTS

| | | | |
|---|---|---|---|
| 2,513,379 | 7/1950 | Thelander | 74/574 |
| 4,601,676 | 7/1986 | Tojima et al. | 192/106.2 |
| 4,747,800 | 5/1988 | Takeuchi | 192/106.2 |
| 4,747,801 | 5/1988 | Chasseguet et al. | 192/106.2 |
| 4,748,868 | 6/1988 | Kobayashi et al. | 192/106.2 |
| 4,904,226 | 2/1990 | Chasseguet et al. | 74/574 |
| 4,919,241 | 4/1990 | Koshimo | 192/106.2 |

FOREIGN PATENT DOCUMENTS

6453339 4/1989 Japan .

Primary Examiner—Leslie A. Braun
Assistant Examiner—Yip: Winnie
Attorney, Agent, or Firm—Burns, Doane, Swecker & Mathis

[57] ABSTRACT

A torque variation absorbing device includes a drive plate connected to a drive shaft, a first fly-wheel and a second-fly wheel integrally connected, and a damping mechanism arranged between the first fly-wheel and the second fly-wheel. The damping mechanism includes a coil spring with a first spring seat fitted into one side of the coil spring and a second spring seat fitted into the other side of the coil spring. A driven disk contacts the first spring seat and is rotatable with the fly-wheels. A first elastic member is provided on the driven disk for interacting with the first spring seat and a second elastic member is provided on the drive plate for interacting with the second spring seat.

11 Claims, 9 Drawing Sheets

TORQUE VARIATION ABSORBING DEVICE

Background of the Invention

1. Field of the Invention

This invention relates to a torque variation absorbing device provided in conjunction with an engine for use in an automotive vehicle.

2. Description of the Related Art

Figure 6:
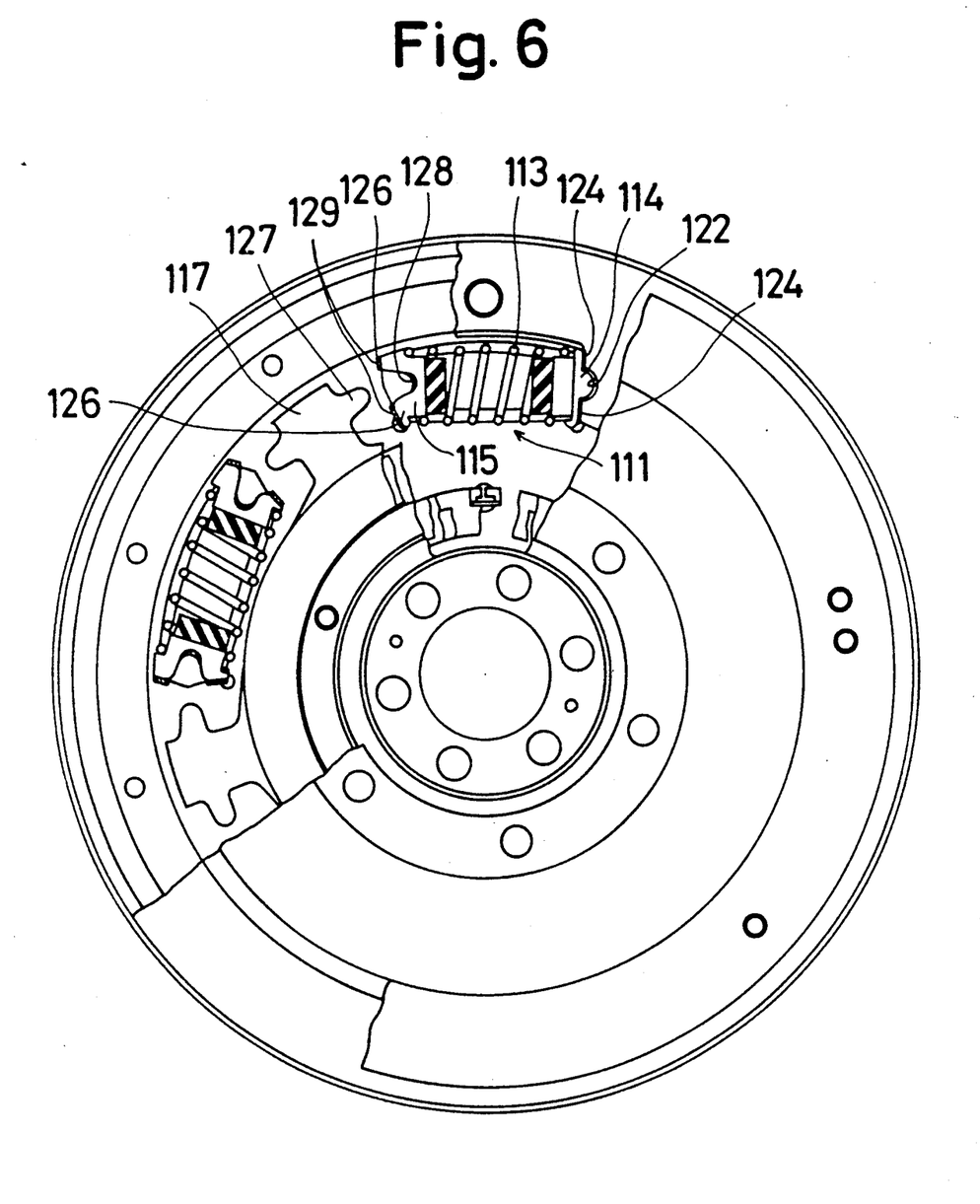
FIG. 6 is a partial cross-sectional view of a conventional torque variation absorbing device.

A prior torque variation absorbing device is known from Japanese Utility Model Laid-Open Print No. 1-55339. As shown in FIG. 6, disclosed therein is a damping mechanism 111 equipped with a coil spring 113 and two spring seats 114,115 fitted onto both sides of the coil spring 113.

Each spring seat 114 and 115 is provided with plural elastic portions 128, 129 on its surface where the spring seats 114 and 115 contact a driven disk 117 and a drive plate (not shown) so as to reduce noise. Accordingly, even if excessive torque is transmitted to the damping mechanism 111 from an engine (not shown), the noise can be reduced.

However, when the spring seat 114 is in contact with the driven disk 117, the plural elastic portions 128, 129 are constantly in compression. Therefore, the plural elastic portions 128, 129 are partially and abnormally worn.

Also when the engine (not shown) rotates quickly, the coil spring 113 is moved outwardly by the centrifugal force of the rotation. In light of the above-mentioned drawbacks, the foregoing device has the axis of both spring seats 114 and 115 off-set inwardly against an axis of the coil spring 113.

However, since the plural elastic portions 128 and 129 are provided at the inner periphery of the plural spring seats 114 and 115, the off-set can not be maintained during the time the plural spring seats 114 and 115 are in contact with the driven disk 117 and the drive plate (not shown).

SUMMARY OF THE PRESENT INVENTION

It is an object of the present invention to provide an improved torque variation absorbing device so that the elastic portion will not be abnormally worn when the spring seat is in contact with a driven disk and a drive plate.

It is still another object of the present invention to provide an improved torque variation absorbing device wherein the off-set between an axis of the spring seats and the axis of the coil spring can be maintained.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein.

DETAILED DESCRIPTION OF PREFERRED EMBODIMENTS OF THE INVENTION

Figure 1:
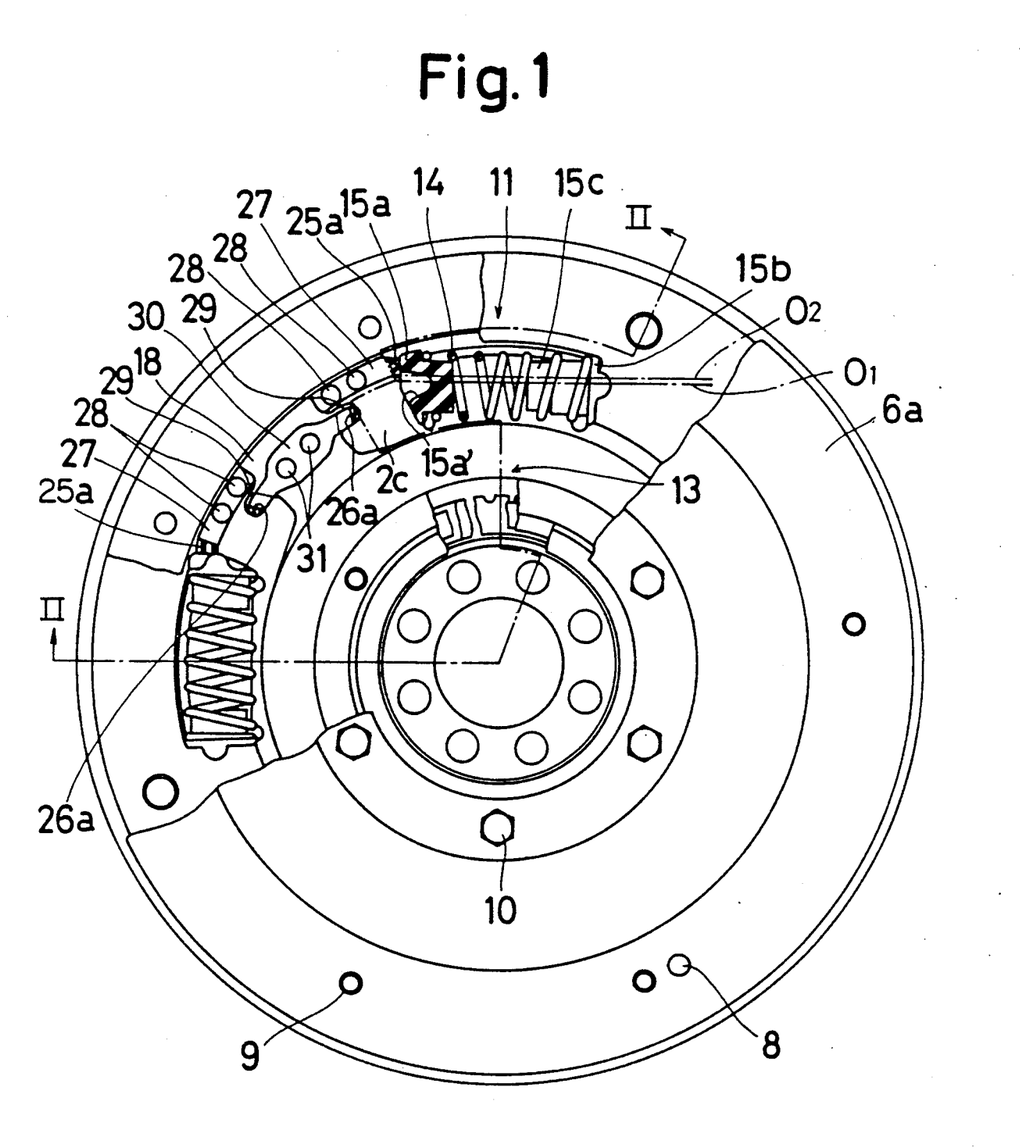
FIG. 1 is a partial cross-sectional view of a torque variation absorbing device illustrating an embodiment of the present invention.
Figure 2:
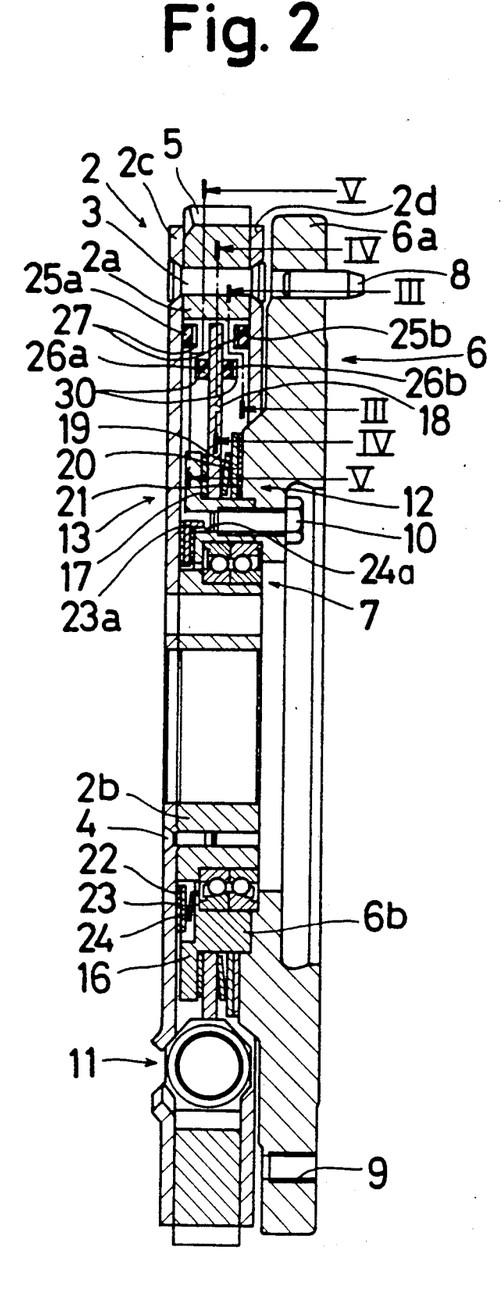
FIG. 2 is a sectional view of a torque variation absorbing device illustrating an embodiment of the present invention taken along line II—II in FIG. 1.
Figure 3A:
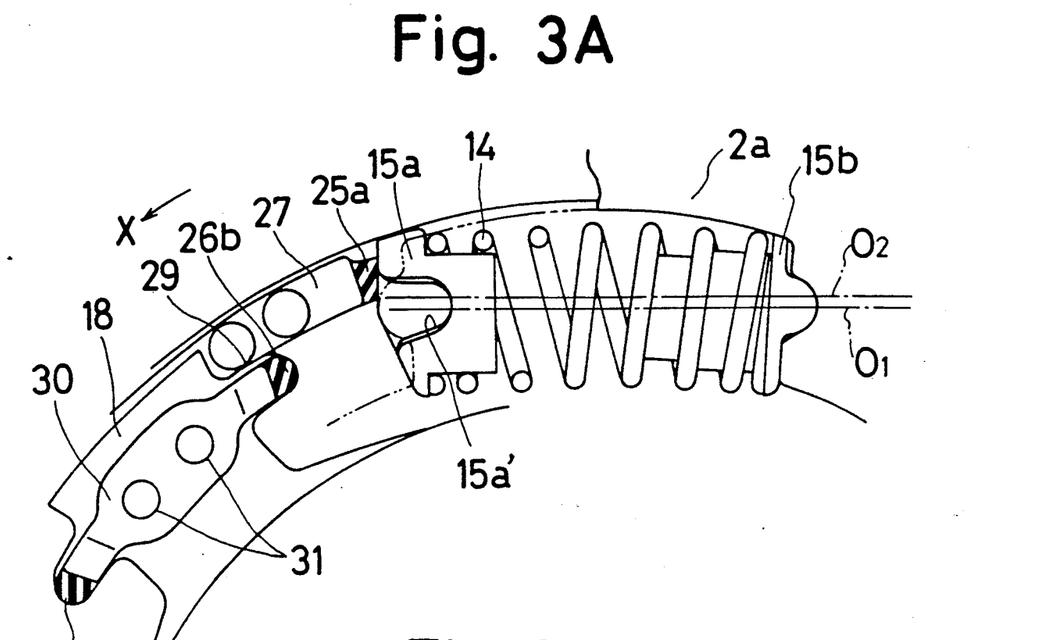
FIG. 3A through FIG. 3D are partially enlarged views showing sequential operation of an elastic portion of the driven disk engageable with a spring seat illustrating an embodiment of the present invention taken along the line III—III in FIG. 2.
Figure 3B:
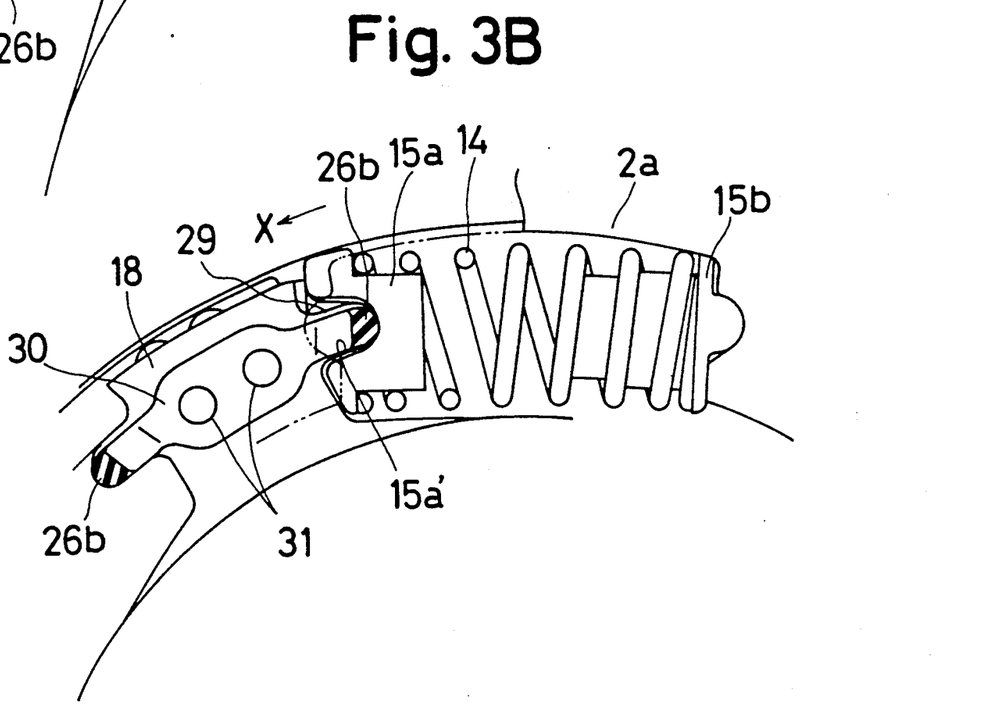
Figure 3C:
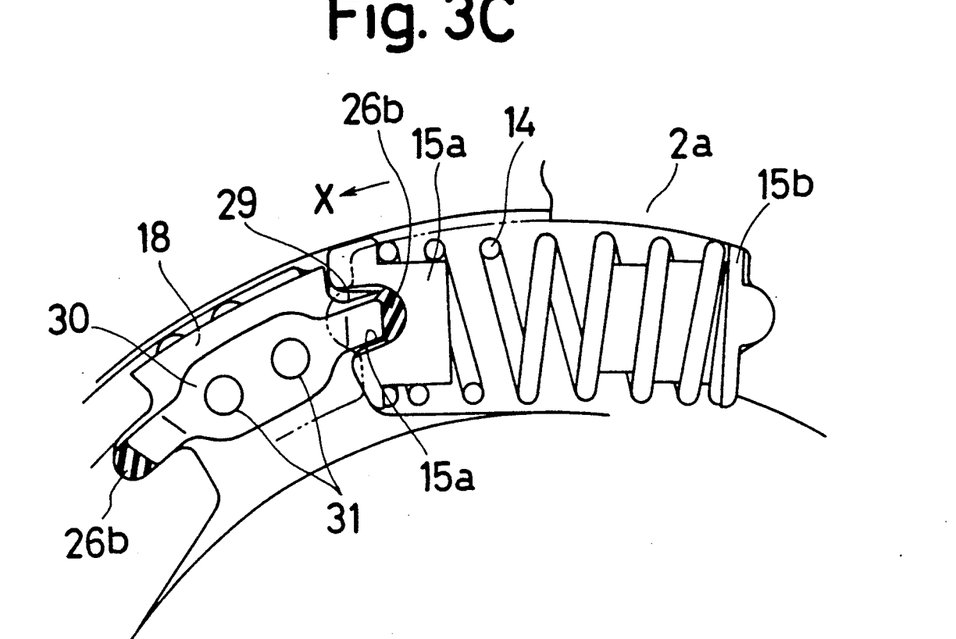
Figure 3D:
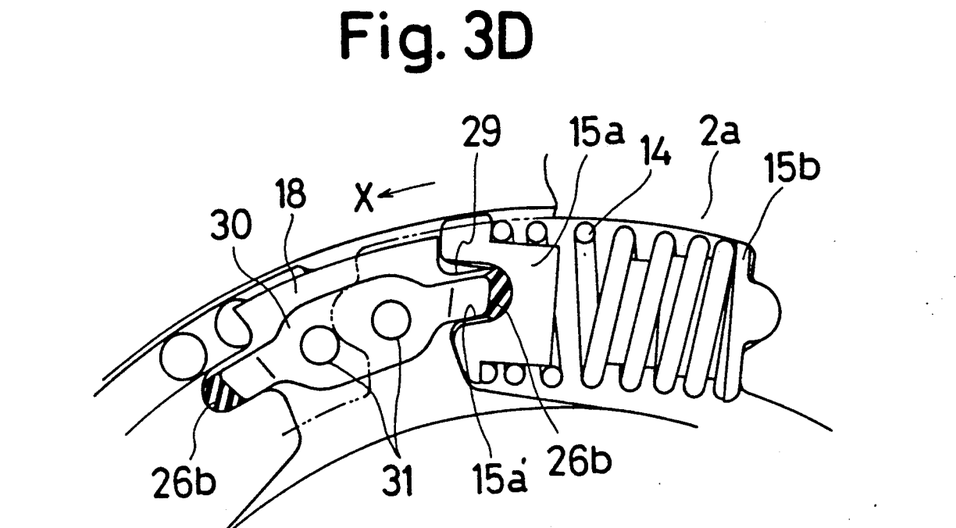

In reference to FIG. 1 and FIG. 2 a drive plate 2 includes a first fly-wheel 2a, 2b and drive side plates 2c, 2d integrally connected to both sides of the first fly-wheel 2a, 2b by rivets 3, 4. Each drive side plate 2c, 2d is made of steel and is integrally rotatable with a drive shaft (not shown). A ring gear 5 which engages with a pinion gear (not shown) of a starter-motor (not shown) is formed at the outer periphery of the first fly-wheel 2a.

A driven plate 6 has the same axis as the drive plate 2 and is arranged to be rotatable with the drive plate 2 through a bearing 7. The driven plate 6 includes a second fly-wheel 6a and a driven plate 6b. The second fly-wheel 6a and a driven plate 6b are integrally connected by a bolt 10. A pin 8 is fitted into a bore of the second fly-wheel 6a so as to adjust the position of a clutch mechanism (not shown). A bore 9 is formed on a second fly-wheel 6a so that a clutch cover (not shown) can be fixed to the second fly-wheel 6a.

A damping mechanism has a coil spring 14 with two spring seats 15a and 15b fitted on the ends of the coil spring 14. An elastic member 15c is fitted inside the coil spring 14 and is secured to either spring seat 15a or 15b or to both of the spring seats 15a and 15b.

A torque limiter 12 is arranged between the second fly wheel 6a and a cut-out portion 16 formed at an edge portion of the driven plate 6b. The torque limiter 12 has a frictional lining 17, a driven disk 18, a cone spring 19, a sub-plate 20, and a frictional lining 21. The rotational torque limiter 12 acts to absorb the torque variation through frictional loss when the cone spring 19 acts against the frictional lining 17 and 21. When the rotational torque is less than the frictional force determined by the cone spring 19, the driven disk 18, the drive plate 2 and the driven plate 6 integrally rotate. On the other hand, when the rotational torque is more than the frictional force determined by cone spring 19, the torque cannot be transmitted due to sliding or slipping movement between the driven disk 18 and the driven plate 6.

A hysteresis mechanism is accommodated between the driven plate 6b and the drive plate 2c. The hysteresis mechanism includes a friction lining 22, a control plate 23 and a cone spring 24. The control plate 23 is ring-shaped and is partly bent. A top end of the bent portion 23a is engaged in a groove 24a formed on the driven plate 6b. The groove 24a extends in the circumferential direction of the driven plate 6b and is arch-shaped. The bent portion 23a rotationally moves in the groove 24a and is regulated in its movement by contact with a side wall of the groove 24a. The friction force generated on the surface of the friction lining 22 when the cone spring 24 urges the friction lining 22 into the drive plate 2c gives a hysteresis characteristic to the device.

Plural elastic portions 25a and 25b as shown in FIG. 2, are snugly fitted on the drive plate 2c and 2d. The plural elastic portions 25a and 25b, for example, are made of a flexible rubber. Other plural elastic portions 26a and 26b are snugly fitted on both sides of the driven disk 18. Plural elastic portions 25a, 25b, 26a, 26b are described below in detail.

Supporting plates 27 are snugly fixed on the inside wall of the drive side plate 2c and 2d which are located on the inside of the first fly-wheel 2a. Elastic portions 25a and 25b are adhered on a top end of the supporting plate 27. Alternatively, the elastic portion 25a or 25b may be covered by the supporting plate 27 as shown in FIG. 2. The elastic portions 25a and 25b are engaged with the drive spring seat 15a and 15b of the inner-side of the axis $0_2$ of spring seats 15a and 15b when the coil spring 14 is extended. Accordingly, the damping mechanism 11 is supported by the flexible plural elastic portion 25a and 25b.

The driven disk 18 circumferentially projects so that the driven disk 18 can be engaged with the plural spring seats, 15a, 15b. A supporting plate 30 is shaped so as to be connected with the projecting portion 29 and is snugly connected on both sides of the driven disk 18 by rivets 31. An elastic portion 26a is held between one of the projecting portion 29 and the supporting plate 30. In the same way, an elastic portion 26b is held between the other of the projecting portion 29 and the supporting plate 30. Each elastic portion 26a and 26b is made of a rubber member and is adhered to the top end of the supporting plate 30. In addition, the elastic portion 26a and 26b may be coated onto the supporting plate 30. The top end of each elastic portion 26a and 26b projects farther than the projecting portion 29 in the circumferential direction. The contact point between the driven disk 18 and the drive spring seat 15a is set to be outward of an axis $0_1$ of the coil spring 14.

In the above mentioned embodiment, the torque variation absorbing device of the present invention operates as follows.

Rotational torque is transmitted to the driven plate 6 from the drive plate 2 through the damping mechanism 11, the torque limiter 12 and the hysteresis mechanism 13. The drive plate 2 rotates relative to the driven plate 6 in the direction of arrow X, as shown in FIG. 3A through 3D to transmit the torque from the drive plate 2 to the driven plate 6. The plural elastic portions 26a and 26b project farther, in a circumferential direction, than the projecting portion 29 of the driven disk 18 around the driven disk 18 and begin to contact or engage with a concave portion 15a' formed on the drive spring seat 15a. With additional engagement, the projecting portion 29 of the driven plate 18 directly contacts the drive spring seat 15a. As a result, the coil spring 14 is compressed by the driven disk 18 and the rotational torque is transmitted to the driven plate 6 from the drive plate 2. Accordingly, each elastic portion 26a and 26b will not be partially and abnormally worn when the drive spring seat 15a is in contact with the driven disk 18. Also, since the coil spring 14 can be compressed inwardly, the off-set between the axis $0_2$ of the spring seats 15a and 15b and the axis $0_1$ of the coil spring 14 can be maintained.

FIG. 4A through 4D and FIG. 5A through 5D illustrate the same operation as described above.

When the driven disk 18 is released, the drive spring seat 15a begins to contact the elastic portions 25a and 25b integral with the supporting plate 27. Thus, noise which would otherwise be generated can be reduced. Further, plural elastic portions 25a and 25b are in contact at the outward portion of the drive spring seat 15a against an axis $0_2$ of both spring seats 15a and 15b, so that the coil spring 14 is urged inwardly.

FIGS. 4A through 4D are partially enlarged views which show a sequential operation of an elastic portion of the driven disk engageable with a spring seat illustrating an embodiment of the present invention taken along the line IV—IV in FIG. 2. Also, FIGS. 4A through 4D illustrate the same operation as FIGS. 3A through 3D.

Figure 4A:
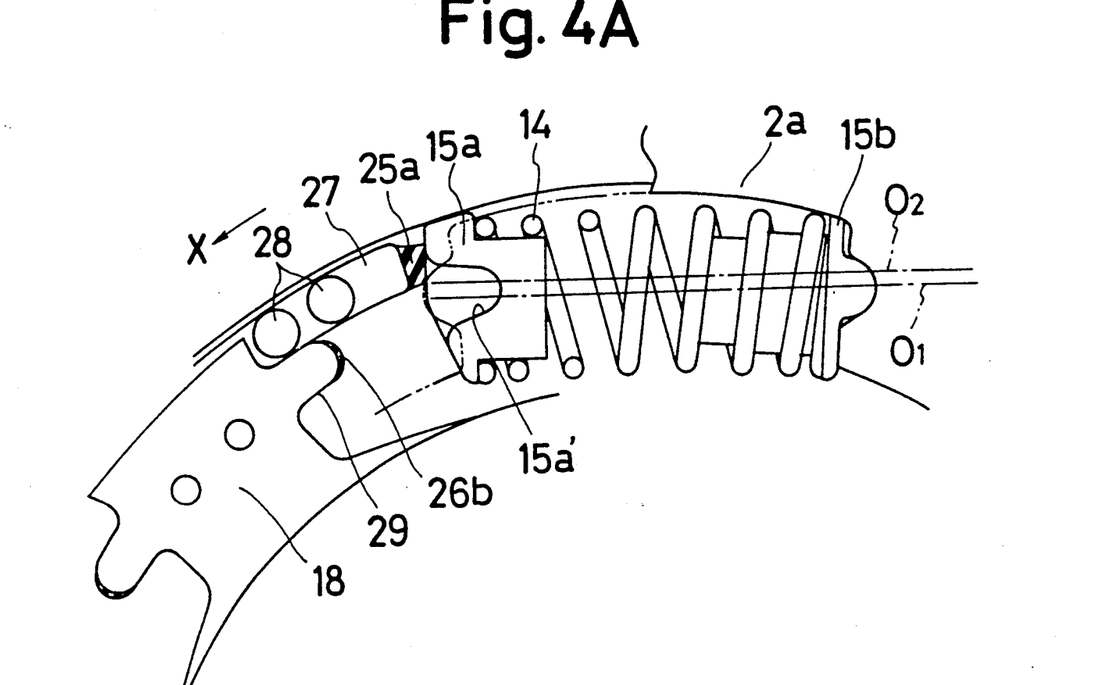
FIG 4A through FIG. 4D are partially enlarged views showing sequential operation of an elastic portion of the driven disk engageable with a spring seat illustrating an embodiment of the present invention taken along the line IV—IV in FIG. 2.
Figure 4B:
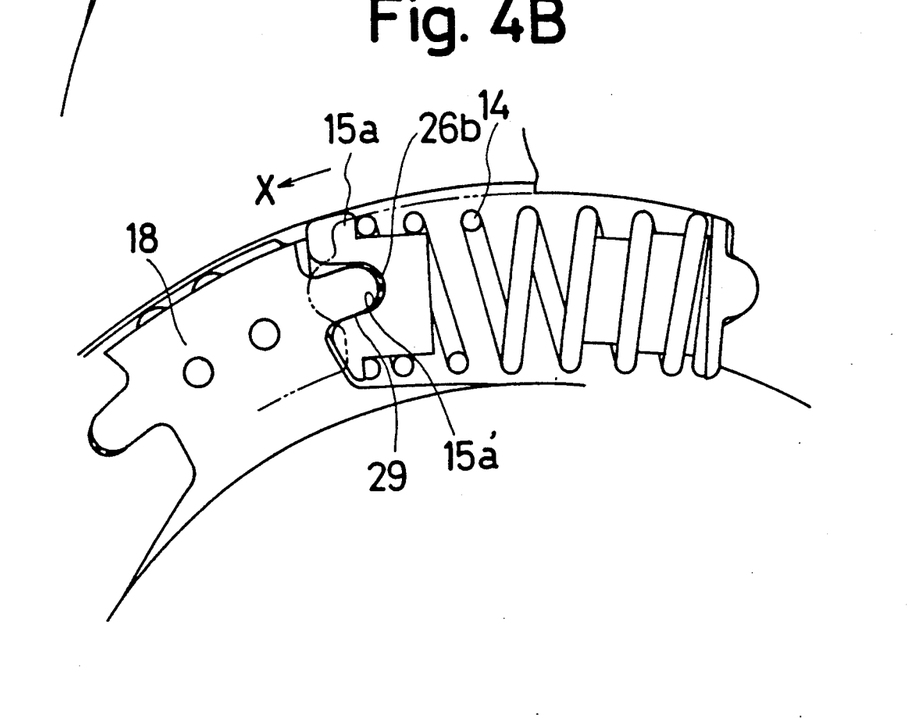
Figure 4C:
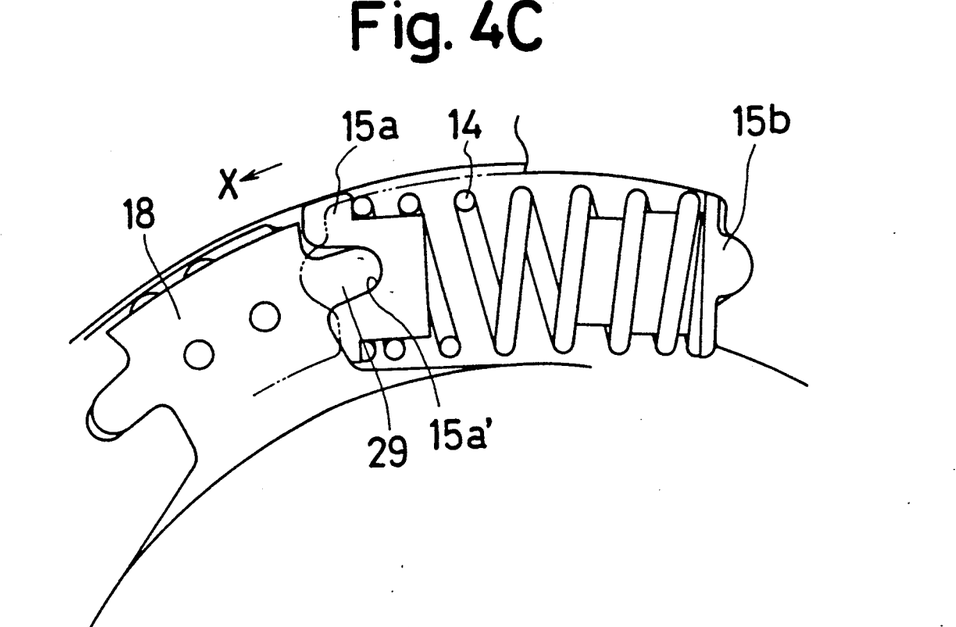
Figure 4D:
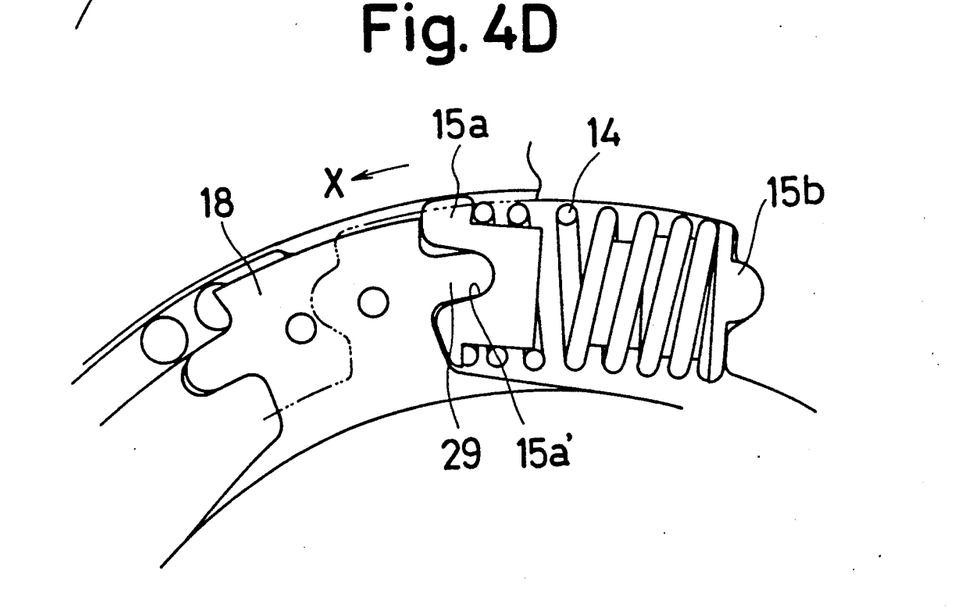

When the drive plate 2 rotates relative to the driven plate 6 in the direction of arrow X, since plural elastic portions 26a and 26b project farther than the projecting portion 29 of the driven disk 18, they begin to contact or engage with a concave portion 15a' and the driven disk 18 is not in contact with the spring seat 15a. With additional engagement, as shown in FIGS. 4C and 4D, the projecting portion 29 of the driven disk 18 directly contacts the drive spring seat 15a. As a result, the coil spring 14 is compressed by the driven disk 18 and rotational torque is transmitted to the driven plate 6 from the drive plate 2.

FIGS. 5A through 5D are partially enlarged views of an elastic portion of the driven disk engageable with a spring seat illustrating an embodiment of the present invention taken along the line V—V in FIG. 2. Also, FIGS. 5A through 5D illustrate the same operation as FIGS. 3A through 3D and FIG. 4A through 4D.

Figure 5A:
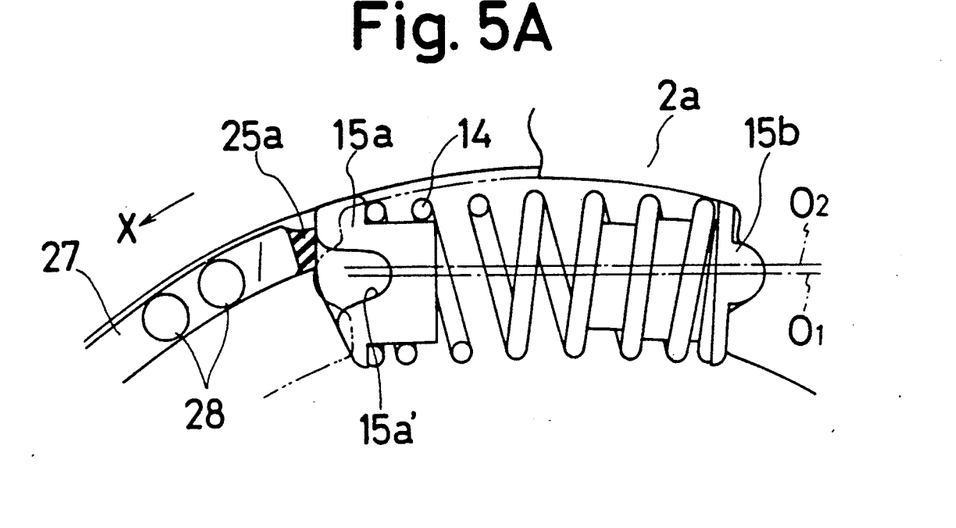
FIG. 5A through FIG. 5D are partially enlarged views showing sequential operation of an elastic portion of the driven disk engageable with a spring seat illustrating an embodiment of the present invention taken along the line V—V in FIG. 2.
Figure 5B:
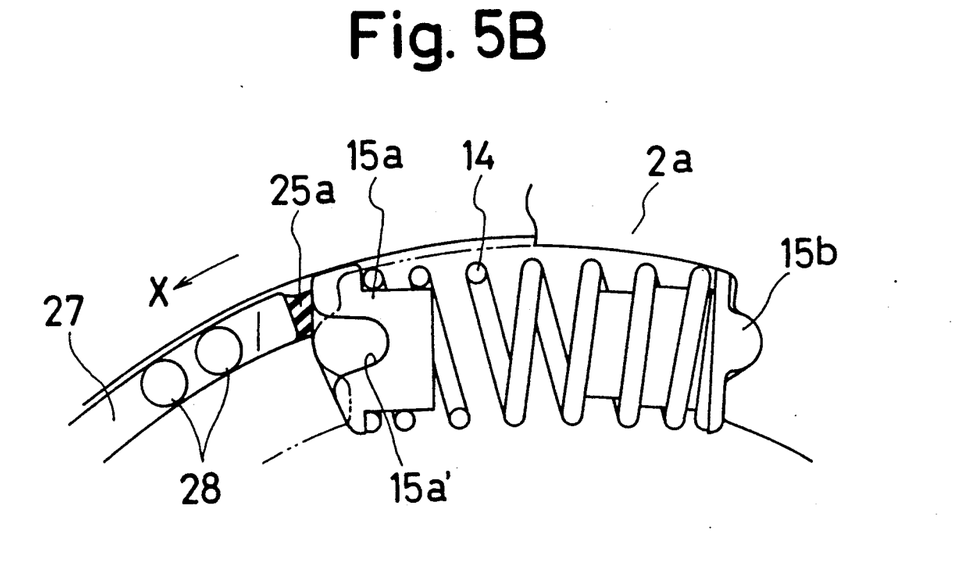
Figure 5C:
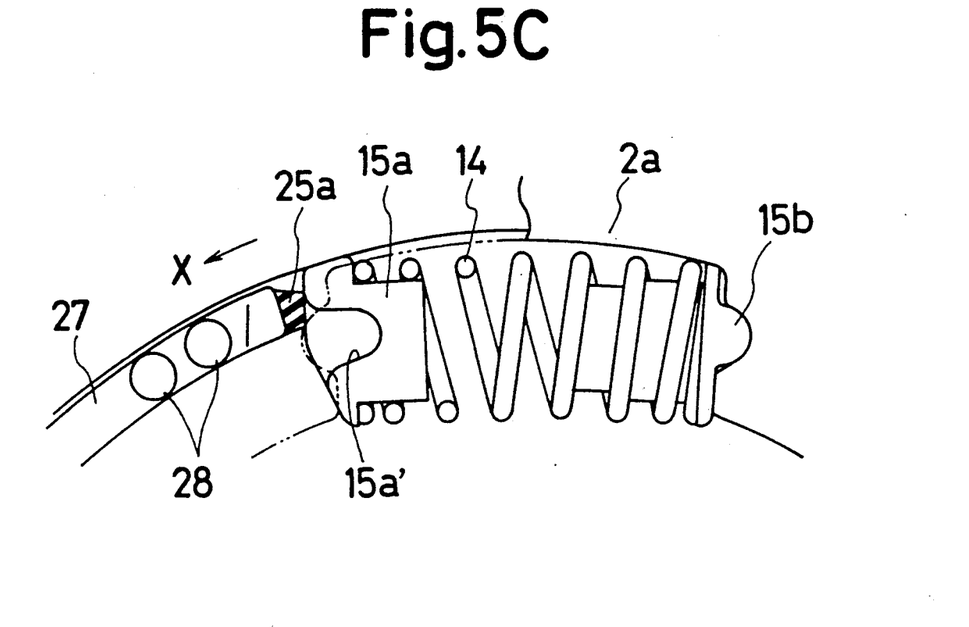
Figure 5D:
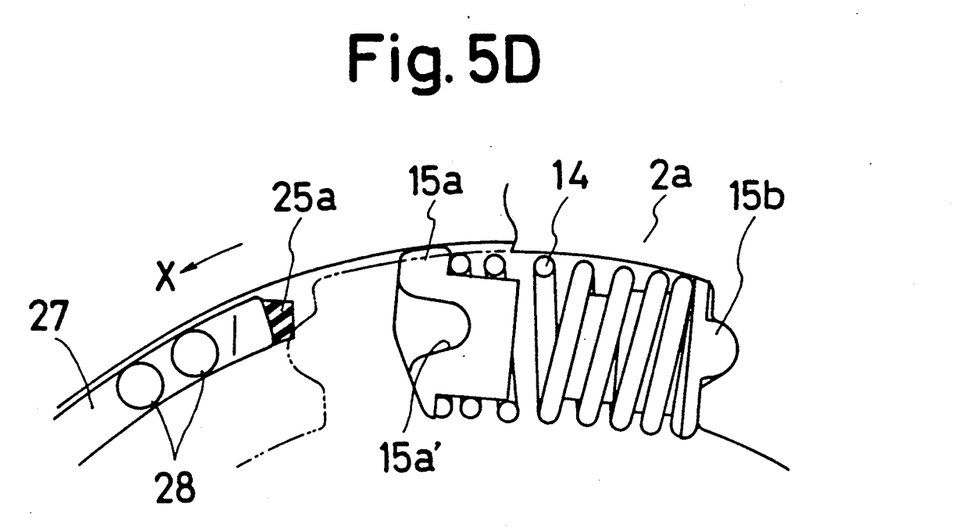

Plural elastic portions 25a and 25b, as shown in FIGS. 5A and 5B, are engaged with the drive spring seats 15a and 15b when rotational torque is not transmitted to the driven plate 6 from the drive plate 2, or when the rotational torque begins to be transmitted therebetween. Then, as plural elastic portions 26a and 26b begin to contact or engage with concave portions 15a', plural elastic portions 25a and 25b, as shown in FIGS. 5C and 5D, are disengaged from the drive spring seats 15a and 15b.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A torque variation absorbing device comprising:
   a drive shaft;
   a drive plate connected to said drive shaft and having a common axis therewith;
   a first fly-wheel and a second fly-wheel having the same axis as said drive plate and being integrally connected;
   a damping mechanism arranged between said first fly-wheel and said second fly-wheel, said damping mechanism including a coil spring having a first spring seat fitted into one side of said coil spring and a second spring seat fitted into the other side of said coil spring;

a driven disk contacting said first spring seat and rotatable with said fly-wheels;

first elastic means provided on said driven disk for connection with said first spring seat and including a supporting plate fixed on said driven disk and an elastic portion mounted thereon, said elastic portion projects farther than said driven disk in a circumferential direction around said driven disk; and a second elastic means provided on said drive plate for engagement with said second spring seat.

2. A torque variation absorbing device according to claim 1, wherein said supporting plate is fixedly connected to said driven disk.

3. A torque variation absorbing device according to claim 1, wherein said second elastic means includes a supporting plate fixed to said drive plate and an elastic portion provided between said supporting plate and said drive plate.

4. A torque variation absorbing device according to claim 3, wherein said elastic portion of said second elastic means is contacted by said second spring seat when said coil spring is compressed.

5. A torque variation absorbing device according to claim 3, wherein said supporting plate of said second elastic means is fixedly connected to said drive plate.

6. A torque variation absorbing device according to claim 1, wherein said first elastic means includes an said elastic portion having said projecting portion contacting a concave portion of said first spring seat, wherein an axis of said projecting portion is radially outward of an axis of said spring seat.

7. A torque variation absorbing device according to claim 1, wherein said second elastic means includes an elastic portion provided on said drive plate in contact with said spring seat and is circumferentially outwardly of an axis of said coil spring.

8. A torque variation absorbing device comprising:
a drive shaft;
a drive plate connected to said drive shaft and having a common axis therewith;
a first fly-wheel and a second fly-wheel having the same axis as said drive plate and being integrally connected;
a damping mechanism arranged between said first fly-wheel and said second fly-wheel, said damping mechanism including a coil spring having a first spring seat fitted into one side of said coil spring and a second spring seat fitted into the other side of said coil spring;
a driven disk contacting said first spring seat and rotatable with said fly-wheels;
first elastic means provided on said driven disk for connection with said first spring seat; and
a second elastic means provided on said drive plate for engagement with said second spring seat,
wherein said second elastic means includes a supporting plate fixed to said drive plate and an elastic portion provided between said supporting plate and said drive plate.

9. A torque variation absorbing device according to claim 8, wherein said elastic portion is contacted by said second spring seat when said coil spring is compressed.

10. A torque variation absorbing device according to claim 8, wherein said supporting plate is fixedly connected to said drive plate.

11. A torque variation absorbing device according to claim 8, wherein said second elastic means includes said elastic portion provided on said drive plate in contact with said spring seat and is circumferentially outwardly of an axis of said coil spring.

* * * * *